A. O. MORSE.
WORK FEEDING DEVICE FOR BORING OR DRILLING MACHINES.
APPLICATION FILED JUNE 30, 1915.
1,261,840.
Patented Apr. 9, 1918.
2 SHEETS—SHEET 1.
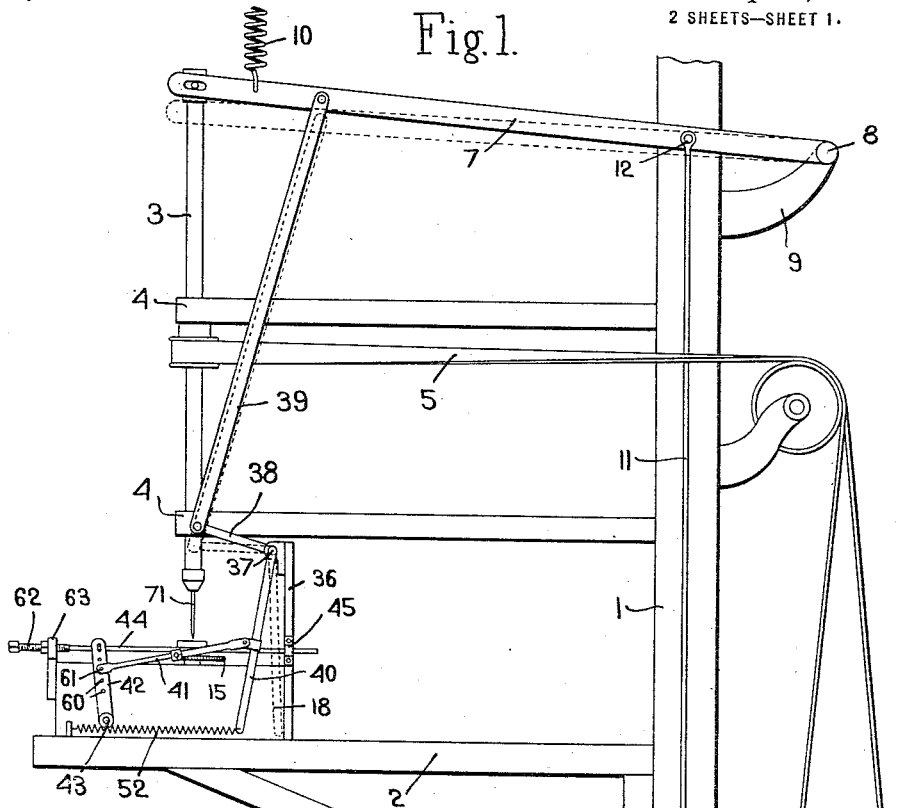
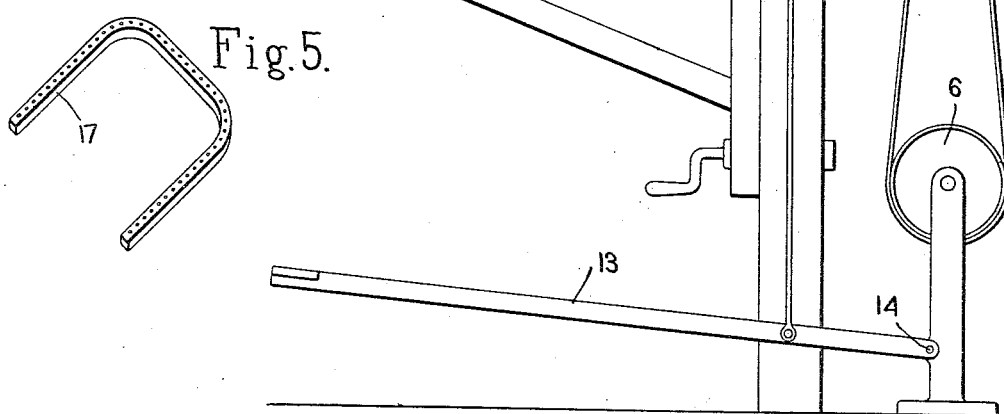
Inventor.
Albert O. Morse,
by Heard Smith & Tennant
Atty's.

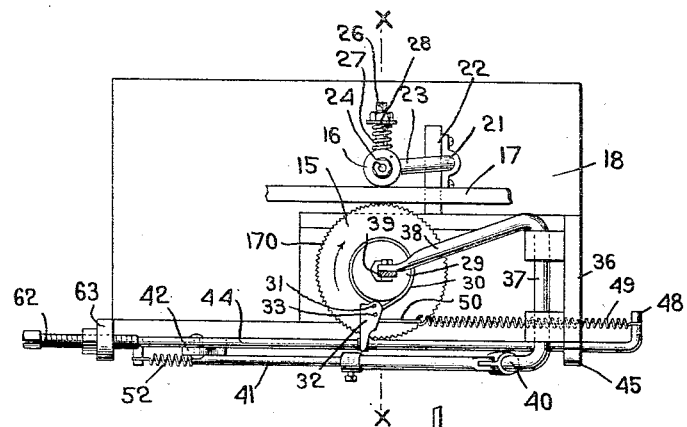
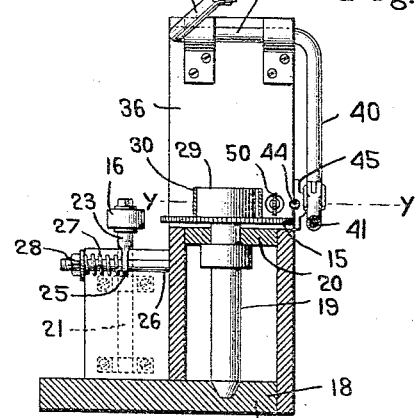
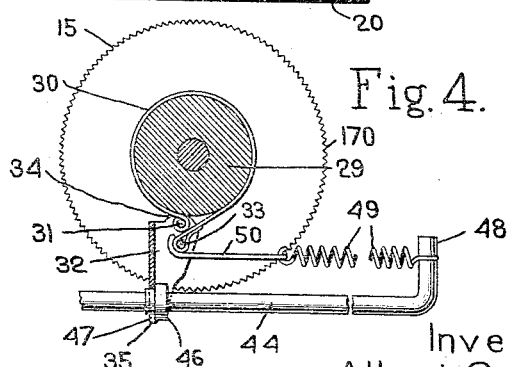

UNITED STATES PATENT OFFICE.

ALBERT O. MORSE, OF LEOMINSTER, MASSACHUSETTS.

WORK-FEEDING DEVICE FOR BORING OR DRILLING MACHINES.

1,261,840.  Specification of Letters Patent.  Patented Apr. 9, 1918.

Application filed June 30, 1915. Serial No. 37,352.

*To all whom it may concern:*

Be it known that I, ALBERT O. MORSE, a citizen of the United States, residing at Leominster, county of Worcester, State of Massachusetts, have invented an Improvement in Work-Feeding Devices for Boring or Drilling Machines, of which the following description, in connection with the accompanying drawing, is a specification, like characters on the drawing representing like parts.

This invention relates to work-feeding devices for boring or drilling machines, and has for its object to provide a novel device of this nature which can be readily applied to any boring or drilling machine and by means of which the work to be bored or drilled will be fed automatically with an intermittent motion so as to properly space the holes as they are bored or drilled.

While the invention is capable of use generally where a plurality of equally-spaced holes are to be bored or drilled in any stock, it is of especial utility in the boring of the frame-work elements of wicker-work construction, such, for instance, as baby carriages, chairs, and other furniture.

In the manufacture of such wicker-work construction, the framework elements have holes bored in them at proper distances apart, into which the ends of the cane are inserted. It is essential that these holes be properly spaced from each other so that when the cane strips are inserted and interwoven the completed article will have a proper finished appearance. One method of boring these holes is to take a templet and lay it on the stock or piece to be bored, and by means of the templet to mark on the stock the location for the various holes. The stock is then taken to the boring machine and the holes are bored at the marked places.

My invention embodies means for automatically feeding the work or stock so as to locate it properly at each boring operation, thus avoiding the necessity of previously marking the location for the holes.

In order to give an understanding of my invention, I have illustrated in the drawings a selected embodiment thereof which will now be described, after which the novel features will be pointed out in the appended claims.

In the drawings, Figure 1 is a side view of a boring machine embodying my invention;

Fig. 2 is a plan view of the work-feeding device;

Fig. 3 is a section on the line *x—x*, Fig. 2;

Fig. 4 is a section on the line *y—y*, Fig. 3;

Fig. 5 shows a framework element of a baby carriage with the holes bored therein.

My invention is adapted for use in connection with any boring or drilling machine. I have shown in Fig. 1 a simple upright boring machine comprising a post or standard 1 having a work-table 2 extending therefrom on which the work to be drilled is supported and provided with a drill spindle 3 operable in bearings 4 and driven by a belt 5 from a driving pulley 6. The drill spindle is connected at its upper end to a lever 7 pivoted at 8 to a bracket 9. This lever has a spring 10 connected thereto which tends normally to raise the drill, and it also has a link or connection 11 connected thereto at 12 which leads to a treadle 13 pivoted at 14 by which the drill can be lowered. The drill itself as thus far described forms no part of my present invention. My improved work-feeding device comprises two rolls 15 and 16 between which the work or stock 17 to be drilled is adapted to be received and means operated automatically by the rising and falling movement of the drill to rotate one of the rolls thereby to feed the stock 17 forward. In the present embodiment of my invention this rotative movement is given to the feed roll 15 and the latter is provided with a serrated periphery 170 so that as it turns it will give positive feeding movement to the stock 17.

I have herein shown the rolls as mounted on a base or frame 18 which is removably supported on the work-table 2 so that it can be removed if it is desired to use the drill without the feeding device. The feed roll 15 is shown as mounted on a spindle 19 which is journaled in bearings 20 formed in the base or frame 18. The roll 16 is in the nature of a presser roll and is yieldingly mounted for movement toward and from the feed roll 15. This is herein accomplished by journaling the roll 16 on the upper end of a spindle or shaft 21 that is journaled in suitable bearings 22 carried by the base or frame 18, said spindle being bent laterally at its upper end, as at 23, so that the portion 24 thereof on which the roll 16 is journaled is offset from the portion 21 thereof. This portion 23 is provided with a loop or eye 25 through which extends a pin or projection 26 extending laterally from the frame 18, said pin having a spring 27 thereon, one end of which engages the eye 25 and the other end of which engages a collar 28 adjustably mounted on the projection 26. The spring 27 thus tends to turn the shaft 21 and carry the presser roll 16 toward the feed roll 15. This construction permits stock 17 of different widths to be operated on and the spring 27 holds the stock firmly against the serrated edge 170 of the feed roll 15.

Means are provided for intermittently rotating the feed roll 15 in the direction of the arrow Fig. 2, thereby to feed the stock 17 with a step-by-step movement. In the present embodiment of my invention this means is actuated from the lever 7 and is so constructed that as the lever 7 rises to withdraw the drill from the stock after a hole is bored, the feed roll 15 will be turned forward. The feed roll 15 has rigid therewith a hub or drum 29 which is encircled by a clutch band 30, one end of said band being connected at 31 to an actuating arm or member 32 and the other end of the band being connected to said arm at 33. Said actuator member 32 is not pivotally mounted on any support, but is a loose or floating member, and in practice, it rests on the upper side of the feed wheel 15. This arm 32 is provided with the cam surface 34 so constructed that when the outer end 35 of the arm is moved to the left Fig. 4, the cam surface 34 will cause the clutch band 30 to be tightened about the drum 29, thus locking the arm to the drum, after which further movement of the actuator 32 toward the left Fig. 4 will operate to turn the drum 29 and thus turn the feed roll 15. On the other hand, movement of the actuator 32 to the right Fig. 4 will loosen the clutch band 30 so that it will slip on the drum 29. Therefore, when the actuator 32 is moved to the left Fig. 4 the feed wheel 15 will be rotated, while when the actuator is moved to the right, the feed wheel 15 will remain stationary. This device, therefore, acts somewhat similar to a pawl-and-ratchet.

I have herein provided means actuated by the lever 7 for giving this vibratory movement to the actuator 32. The base or frame 18 has a standard 36 rising from one end thereof to which is pivoted a rock-shaft 37 having one arm 38 thereof connected to the lever 7 by a link 39. The other arm 40 of the rock shaft is pivotally connected to a link 41 which in turn is connected to an arm 42 pivoted to the base or frame at 43. This arm 42 is connected to a rod or slide 44 which is guided in suitable bearings 45 carried by the base or frame 18. This slide 44 extends through a slot 47 formed in the end 35 of the member 32 and has a collar 46 thereon which is adapted to engage said end of the actuator. The outer end of the slide 44 is bent laterally, as shown at 48, and a spring 49 is connected to the end 48 and to a hooked connection 50 which hooks over the connection 33 between the clutch band and the actuator 32. The arm 40 of the rock shaft 37 is acted upon by a pulling spring 52.

Assuming that the lever 7 is in its lowered position as shown by dotted lines Fig. 1 which is the position it will assume when the drill has entered the work, it will be seen that when the drill is elevated from the work and the lever 7 moves upwardly it will operate through the link 39 to turn the rock-shaft 37 thereby to carry the arm 40 from the dotted to the full line position Fig. 1. This movement of the arm 40 will operate through the link 41 and lever 42 to move the slide 44 to the left Figs. 1 and 4 thereby bringing the collar 46 against the end of the actuator 32. When this occurs the further movement of the slide 44 will turn the actuator 32 to cause the cam surface 34 to tighten the clutch band 30 about the drum 29, thus locking the actuator to the drum, and the continued further movement of the slide 44 will turn the drum and the feed wheel 15 in the direction of the arrow, Fig. 2, thus feeding the work 17 forward. This locking of the clutch band 30 to the drum is effected by the coöperation of the slide 44 and the spring 49. This spring is under tension at all times and it tends normally to move the actuator 32 to the right Fig. 4 so that this tendency on the part of the spring, together with the movement of the slide 44 to the left, results in turning the actuator to cause the clutch band to be locked or clutched to the drum 29. The parts are so designed that during the initial upward movement of the lever 7 necessary to withdraw the drill from the work, the slide 44 is moved forwardly sufficiently to bring the collar 46 into engagement with the actuator 32 and, therefore, as soon as the drill has been removed from the work the clutch band 30 will be gripped to the drum 29 so that during the further upward movement of the lever 7 the feed wheel 15 will be moved forwardly.

With this attachment, therefore, the operator need pay no attention to the feeding of the work 17 as it will be fed automatically at each upward movement of the drill.

The device is constructed so as to permit adjustment of the extent of feeding movement, this being herein accomplished by adjustable means for limiting the movement of the slide or rod 44 toward the left, Fig. 1. I have shown for this purpose a stop screw 62 which is adjustably mounted in a bracket 63 carried by the base 18 and which is situated in line with the slide 44 so that it will limit the movement of the slide to the left. It is the movement of the slide to the left which gives the feeding movement to the feed roll 15, and by means of the stop screw 62 the extent of this feeding movement can be regulated. It will, of course, be obvious that the drill 71 will be so adjusted that the hole will be bored to the proper depth when the slide 44 comes against the stop screw 63.

I have also shown an adjustable connection between the link 41 and the lever 42 which may also be made use of in controlling the extent of feeding movement. The lever 42 is shown as provided with a plurality of holes 60 into any one of which may be entered the pin 61 that constitutes the pivotal connection between the link 41 and lever 42.

My invention is very simple in its construction and effective in operation. Since the operative parts are all sustained by the base or frame 18 which is detachably mounted on the work support 2, the device can be readily removed from or attached to any drill or boring machine by simply connecting the link 39 to or disconnecting it from the lever 7.

I claim:

1. A feed device comprising a friction drum, an actuator arm, a flexible friction band encircling the drum and having its ends connected to said actuator at different points, a reciprocating member, a spring connecting said member with said actuator and tending to swing the latter in a direction to loosen the friction band on the drum, and a collar on said reciprocating member adapted to engage said actuator as the member moves in one direction and thereby move said actuator in a direction opposite to that in which the spring tends to move it whereby the friction band is caused to grip the drum and thus turn the same.

2. A feed device comprising a friction drum, a floating actuator arm, a flexible friction band encircling the drum and having its ends connected to said actuator at different points, a reciprocating member, a spring connecting said member with said actuator and tending to swing the latter in a direction to loosen the friction band on the drum, and a collar on said reciprocating member adapted to engage said actuator as the member moves in one direction and thereby move said actuator in a direction opposite to that in which the spring tends to move it whereby the friction band is caused to grip the drum and thus turn the same.

3. A feed device comprising a friction drum, an actuator arm, a flexible friction band encircling the drum and having its ends connected to said actuator at different points, a reciprocating member, adjustable means for regulating the extent of movement of the reciprocating member and thereby the extent of feed, a spring connecting said reciprocating member with said actuator and tending to swing the latter in a direction to loosen the friction band on the drum, and a collar on said reciprocating member adapted to engage said actuator as the member moves in one direction and thereby move said actuator in a direction opposite to that in which the spring tends to move it whereby the friction band is caused to grip the drum and thus turn the same.
4. A feed device comprising a friction drum, a floating actuator arm, a flexible friction band encircling the drum and having its ends connected to said actuator at different points, a reciprocating member, means for regulating the extent of movement of the reciprocating member and thereby the extent of feed, a spring connecting said reciprocating member with said actuator and tending to swing the latter in a direction to loosen the friction band on the drum, and a collar on said reciprocating member adapted to engage said actuator as the member moves in one direction and thereby move said actuator in a direction opposite to that in which the spring tends to move it whereby the friction band is caused to grip the drum and thus turn the same.

In testimony whereof, I have signed my name to this specification.

ALBERT O. MORSE.